J. HUNT.
FISH STOP.
APPLICATION FILED JULY 31, 1917.
1,261,936.
Patented Apr. 9, 1918.
4 SHEETS—SHEET 3.
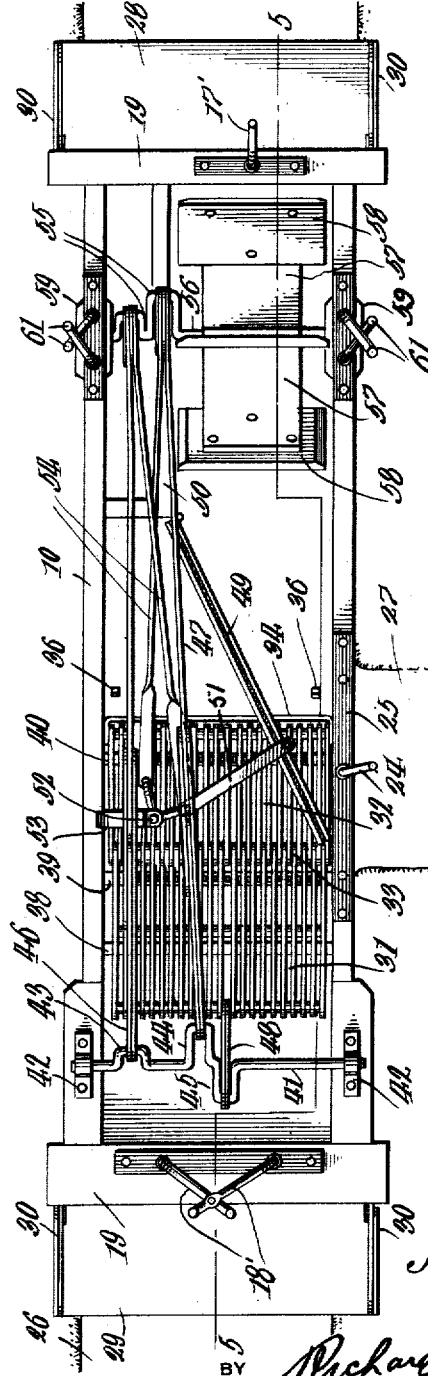
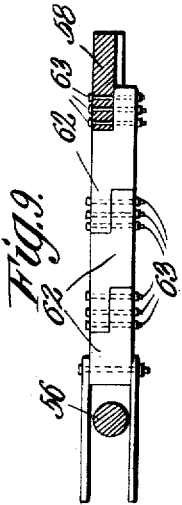
WITNESSES
Guy M. Spring
INVENTOR
John Hunt
BY Richard B. Owen
ATTORNEY

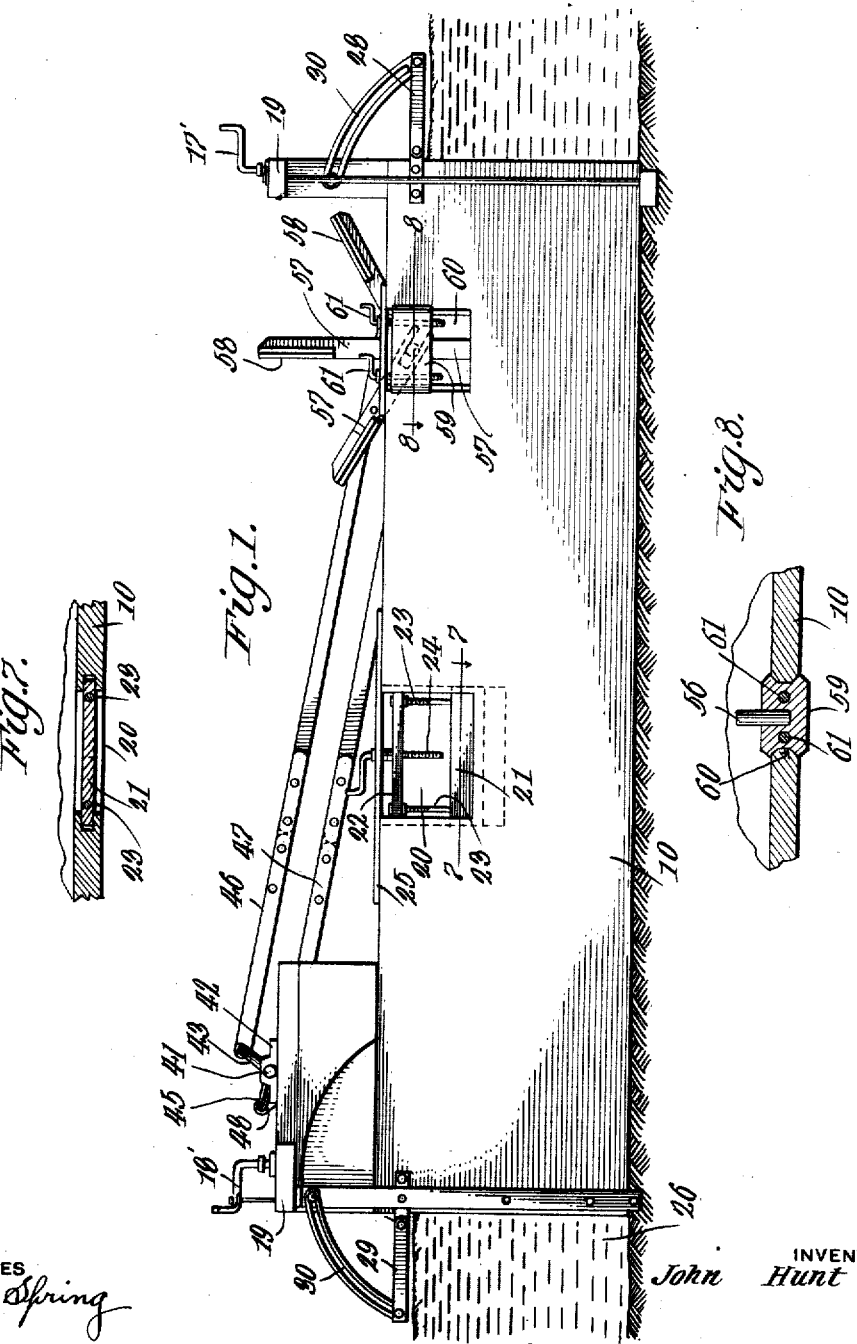

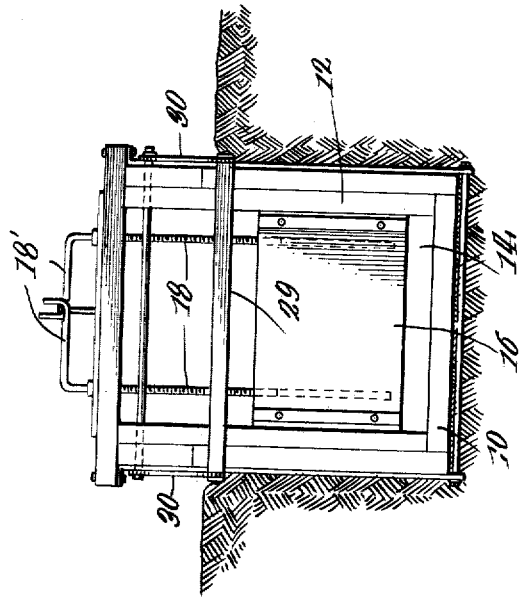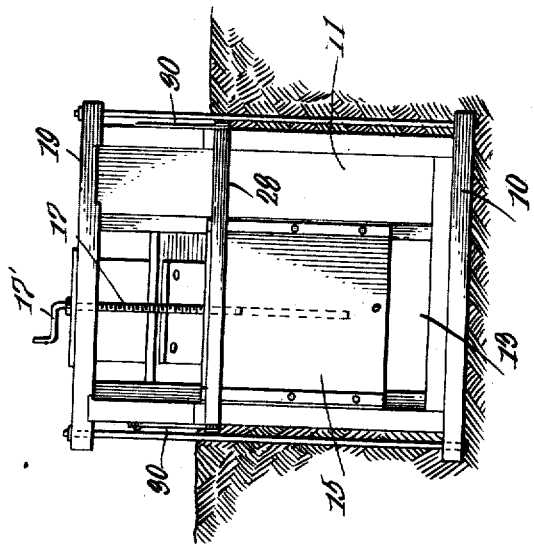

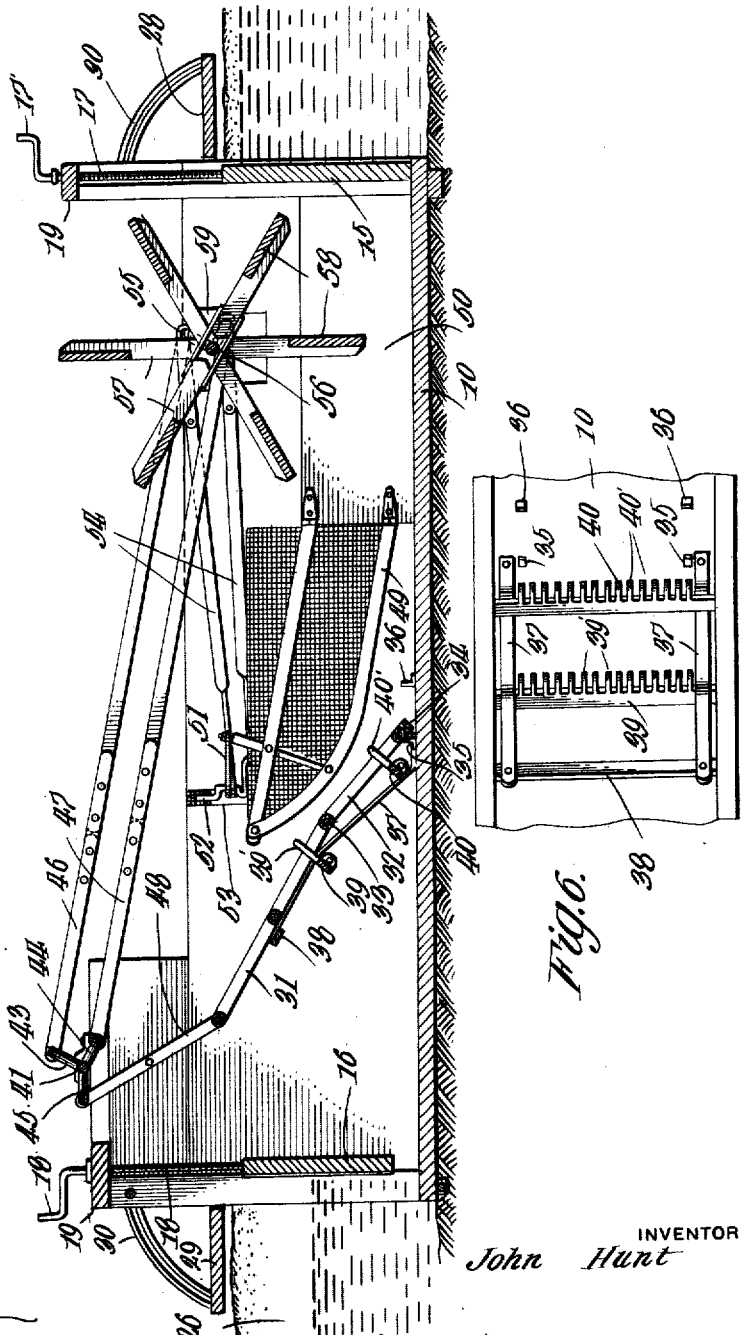

UNITED STATES PATENT OFFICE.

JOHN HUNT, OF DUMONT, COLORADO.

FISH-STOP.

1,261,936.  Specification of Letters Patent.  Patented Apr. 9, 1918.

Application filed July 31, 1917. Serial No. 183,793.

*To all whom it may concern:*

Be it known that I, JOHN HUNT, a citizen of the United States, residing at Dumont, in the county of Clear Creek and State of Colorado, have invented certain new and useful Improvements in Fish-Stops, of which the following is a specification.

This invention relates to an improved fish stop for use in connection with an irrigating ditch and the principal object of the invention is to provide a fish stop which may be placed in the mouth of the irrigating ditch and serve to keep small fish out of the same, a movable screen being mounted in the trough of the guard and a sweeper being provided for the screen, the sweeper and screen being actuated from a crank shaft carrying a paddle wheel turned by the water flowing through the trough.

Another object of the invention is to so construct this screen that it may be formed of a plurality of sections extending longitudinally of the trough and upwardly therein toward the outlet end, the upper end portion of the screen being connected with a crank shaft or driven shaft rotated from the crank shaft carrying the paddle wheel.

Another object of the invention is to so mount the sweeper that it will have movement transversely of the trough and to further so mount this sweeper that its movement will be in operative relation to the overflow outlet through which the fish will pass into a spill-way leading back into the river.

Another object of the invention is to so construct this paddle wheel that it may be vertically adjusted and to further so construct it that the blades thereof may be lengthened when desired.

Another object of the invention is to so construct the device that it will be efficient in operation, the sweeper keeping the screen clear of trash and the trough being so constructed that the flow of water through the same may be regulated through the medium of gates placed at the inlet and outlet and at the overflow or spill-way outlet.

This invention is illustrated in the accompanying drawings, wherein:—

Figure 1 is a view showing the improved fish stop in side elevation;

Fig. 2 is a view in end elevation looking at the inlet end of the fish stop,

Fig. 3 is a view in end elevation looking at the outlet end of the fish stop;

Fig. 4 is a top plan view of the improved fish stop,

Fig. 5 is a longitudinal sectional view through the improved fish stop,

Fig. 6 is a fragmentary top plan view showing the support for the sliding screen, Fig. 7 is a longitudinal sectional view taken along the line 7—7 of Fig. 1, Fig. 8 is a longitudinal sectional view taken along the line 8—8 of Fig. 1, Fig. 9 is a fragmentary view of the paddle wheel showing one blade extended or built up for additional length.

This fish stop is provided with a trough or body 10 having end walls 11 and 12 in which are provided the inlet 13 and the outlet 14, drop gates 15 and 16 being provided for the inlet and outlet and suspended through the medium of the threaded stems 17 and 18 which stems are rotatably supported by cross bars 19 and have their upper end portions formed into crank handles 17' and 18'. By turning these crank handles, the gates may be raised or lowered and thus the flow of water through the trough regulated. The spill-way or overflow outlet 20 is provided in one of the side walls of the trough and is provided with a gate 21 slidably mounted as shown in Fig. 7 and provided with a hanger bar or head 22 connected with the gate by rods 23 and engaged by a threaded stem 24. This threaded stem 24 is rotatably supported by a cross bar 25 and when turned will raise or lower the gate for the spill-way. From an inspection of Fig. 4, it will be readily seen that this guard is placed at the mouth of the irrigating ditch 26 so that water flowing from the river into the irrigating ditch must pass through the trough. It will be further noted that the spill-way outlet is positioned to communicate with the spillway or trough or return trough 27 which will lead back to the river and return the fish which enter the trough from the river. In order to permit of easy access to the crank handles 17' and 18' there have been provided platforms 28 and 29 hingedly connected with the end portions of the trough and supported when in a lowered position by the brackets 30.

The screen is provided with upper and lower sections indicated in general by the numerals 31 and 32 having their adjoining ends pivotally connected as shown at 33, so that the screen may bend at a point intermediate its length when in movement. A shoe 34 is provided at the bottom of the screen to engage the bottom of the trough thus protecting the screen from wear and further preventing the longitudinally extending strips forming the screen from cutting through the bottom of the trough. Abutment lugs 35 and 36 are carried in the bottom of the trough to engage the shoe and thus limit the sliding movement of the screen in the trough. This screen rests upon a frame or rack shown in Figs. 5 and 6, the rack having side bars 37 and cross bars 38, 39 and 40. It should be noted that the cross bars 39 and 40 are provided with teeth 39' and 40' extending between the strips forming the screen and thus serving as guiding means for the screen and further serving as means for removing trash which might collect between the strips of the screen. A crank shaft 41 is mounted in bearings 42 and provided with crank extensions 43, 44 and 45 with which are connected links or pitman rods 46, 47 and 48. This pitman rod 48 is pivotally connected with the upper end of the screen and as the crank shaft rotates, the screen will thus be moved longitudinally of the trough. In order to clean the screen and further in order to move the fish toward the spillway outlet 20, there has been provided a sweeper 49 hingedly connected with an offset 50 and engaged by a link 51 carried by the crank shaft 52. This crank shaft is rotatably carried by the bracket 53 and is engaged by the pitman rods 54 leading from the crank extensions 55 of the crank shaft or paddle shaft 56. The pitman rods 46 and 47 are also connected with these crank extensions 55 and it will thus be seen that this paddle shaft will constitute a driving shaft from which movement may be imparted to the screen and sweeper. The paddle arms 57 radiate from the shaft and carry heads 58 extending in the path of the water flowing through the trough so that when this device is in operation, the paddle wheel will be rotated thus rotating the driving shaft 56. It should be noted that this driving shaft is mounted in bearing blocks 59 slidably mounted in pockets 60 formed in the side walls of the trough and engaged by threaded suspended stems 61 thus permitting the bearing blocks to be adjusted vertically to hold the blades of the paddle wheel at the proper distance from the bottom of the trough. From an inspection of Fig. 9 it will be readily seen that if desired, the arms of the paddle wheel can be formed in separable sections connected by bolts or other removable fasteners 63 thus permitting the arms to be extended.

This fish stop will be placed at the inlet of the irrigating ditch and the water flowing from the river into the irrigating ditch may flow through the trough and engage the paddle wheel thus rotating the paddle wheel and the crank shaft or driving shaft carrying the paddle wheel. The pitman rods 46, 47 and 54 will impart rotary movement to the crank shafts 41 and 52 and as these crank shafts rotate, sliding movement will be imparted to the screen and oscillating movement will be imparted to the sweeper or brush 49. The space between the strips forming the screen will be sufficient to permit the water to readily flow through the trough but will not be large enough to permit the fish to pass. These fish together with any trash which may collect in the trough will be swept through the spill-way outlet by the sweeper and will be returned to the river through the spill-way. It will thus be seen that a very efficient fish stopping device has been provided.

What is claimed is:—

1. A fish guard comprising a trough having an inlet and an outlet, a screen mounted in the trough for free sliding movement longitudinally of the trough, a sweeper pivotally mounted in the trough for oscillating movement transversely of the trough in operative relation to the screen and between the screen and the inlet of the trough, and means for imparting movement to the screen and to the sweeper.

2. A fish guard comprising a trough having an inlet and an outlet, a screen slidably mounted in the trough, a sweeper movably mounted in the trough in operative relation to the screen, and means for imparting movement to the screen and sweeper.

3. A fish guard comprising a trough having an inlet and an outlet and a spill-way at a point intermediate the inlet and outlet, a screen slidably mounted in the trough in operative relation to the spill-way, a sweeper movably mounted in the trough in operative relation to the screen and spill-way and means for imparting movement to the screen and sweeper.

4. A fish guard comprising a trough having an inlet and outlet and a spill-way, a support positioned in the trough adjacent the spill-way, a screen slidably carried by said support for movement longitudinally of the trough, and means for supporting the screen and imparting reciprocating movement thereto as water passes through the trough.

5. A fish stop comprising a trough having an inlet and an outlet and a spill-way at a point intermediate the inlet and the outlet, a support positioned in the trough adjacent the spill-way, a screen slidably carried by the support and formed of longitudinally extending strips positioned in spaced relation, the support being provided with fingers extending between the strips to guide the sliding movement of the screen, a crank shaft rotatably connected with said trough, a link pivotally connected with the crank shaft and with the upper end portion of the sliding screen, and means for imparting rotary movement to the crank shaft.

6. A fish guard comprising a trough having an inlet and an outlet and a spill-way at a point intermediate the inlet and the outlet, a screen slidably mounted in the trough at a point adjacent the spill-way and formed of upper and lower sections pivotally connected, and means connected with the screen for imparting sliding movement thereto as water passes through the trough.

7. A fish guard comprising a trough provided with an inlet and an outlet and a spill-way at a point intermediate the inlet and outlet, a screen slidably mounted in the trough in operative relation to the spill-way, a sweeper pivotally mounted in the trough in operative relation to the screen, a paddle wheel including an axle, and means for transmitting movement from the axle of the paddle wheel to the sweeper and screen as the paddle wheel rotates.

8. A fish guard comprising a trough having an inlet and an outlet and a spill-way, a screen slidably mounted in the trough adjacent the spill-way, for movement longitudinally of the trough, and means for supporting the screen and imparting reciprocating movement thereto as water passes through the trough.

9. A fish guard comprising a trough having an inlet and an outlet, a screen slidably mounted in the trough at a point intermediate the inlet and outlet and formed of upper and lower sections pivotally connected, and means connected with the screen for imparting sliding movement thereto as water passes through the trough.

In testimony whereof I affix my signature in presence of two witnesses.

JOHN HUNT.

Witnesses:
ADOLPH NELSON,
E. E. MCCLELLAND.

Copies of this patent may be obtained for five cents each, by addressing the "Commissioner of Patents, Washington, D. C."